US005330847A

United States Patent [19]

Murphy et al.

[11] Patent Number: 5,330,847

[45] Date of Patent: Jul. 19, 1994

[54] TREATMENT OF WOOD AND WOOD-BASED MATERIALS

[75] Inventors: Richard J. Murphy, London; David J. Dickinson, Haywards Heath; Philip Turner, London, all of United Kingdom

[73] Assignee: Imperial College of Science, Technology & Medicine, London, United Kingdom

[21] Appl. No.: 635,593

[22] PCT Filed: Jul. 20, 1989

[86] PCT No.: PCT/GB89/00836

§ 371 Date: Jan. 18, 1991

§ 102(e) Date: Jan. 18, 1991

[87] PCT Pub. No.: WO90/00959

PCT Pub. Date: Feb. 8, 1990

[30] Foreign Application Priority Data

Jul. 21, 1988 [GB] United Kingdom ................ 8817349
May 8, 1989 [GB] United Kingdom ................ 8910510

[51] Int. Cl.[5] .............................................. B32B 21/04
[52] U.S. Cl. ................................ 428/537.1; 427/254; 427/255.2; 427/297; 427/393.3; 427/317

[58] Field of Search .................. 427/254, 393.3, 255.2, 427/255.3, 297, 317; 118/719, 726; 428/537.1

[56] References Cited

U.S. PATENT DOCUMENTS

| | | | |
|---|---|---|---|
| 3,342,629 | 9/1967 | Martin | 428/541 |
| 4,012,507 | 3/1977 | Knoepfler et al. | 427/255.3 |
| 4,354,316 | 10/1982 | Schroeder | 34/13.8 |
| 4,678,686 | 7/1987 | Park | 427/254 |
| 5,024,861 | 6/1991 | Vinden et al. | 424/254 |

FOREIGN PATENT DOCUMENTS 49-016922 4/1974 Japan .

*Primary Examiner*—Shrive Beck
*Assistant Examiner*—Diana Dudash
*Attorney, Agent, or Firm*—Fay, Sharpe, Beall, Fagan, Minnich & McKee

[57] ABSTRACT

A method of treating moisture containing wood including the step of exposing the timber or wood to a vaporous azeotrope of an organ-boron component and an alcohol at a temperature below the alcohol's boiling point. The organ-boron compound hydrolyses with the moisture to form boric acid in the timber or board.

21 Claims, 1 Drawing Sheet

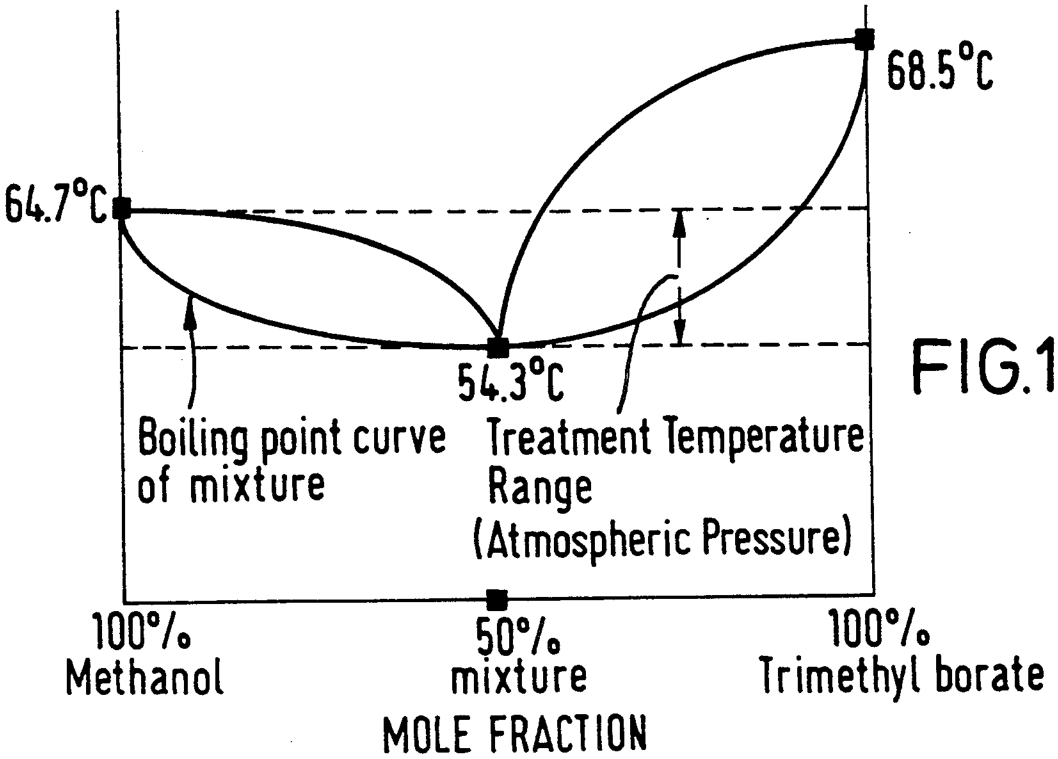
FIG. 1
FIG. 2
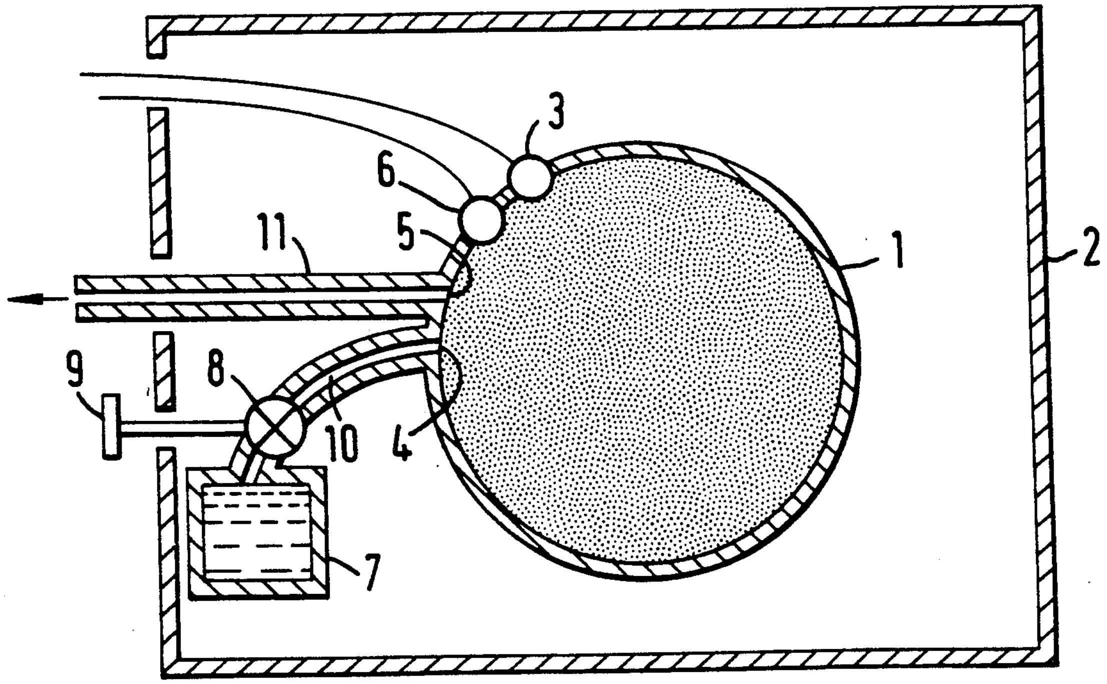

TREATMENT OF WOOD AND WOOD-BASED MATERIALS

This invention is concerned with methods for the preservative treatment of timber and wood-based products e.g. wood-based boards, to offer protection against rot, insect attack or to impart flame or fire resistance. The invention also embraces apparatus suitable for carrying out the method and materials treated by the process and/or in such apparatus.

Many organo-boron compounds are gases or low boiling point liquids. When arranged to contact with timber or wood-based products, certain of these compounds hydrolyse with the wood moisture to release the boron as boric acid in the timber. For example, trimethyl borate (TMB) is believed to react with moisture in wood to form boric acid by the reaction:

$$B(OCH_3)_3+3H_2O \rightarrow H_3BO_3+3CH_3OH$$

Thus, according to this reaction, the organo-boron compound trimethyl borate is capable of hydrolysing to boric acid reaction product and other reaction product, which is methanol in this case. Of the two reaction products, methanol has the lower boiling point about 64.7° C. at atmospheric pressure.

Trimethyl borate boils at about 68.5° to 69° C. at atmospheric pressure. In previously known treatments, application of the vapour at high temperature required both the treatment vessel and the timber to be heated to prevent condensation of the vapour. Wood moisture content also affected the quantity of trimethyl borate converted to boric acid.

Proposed treatments at working moisture contents of wood have been found to be largely ineffective for bulk timber because of incomplete penetration of the TMB beyond a surface layer of the timber. Reduction of wood moisture content was found to increase penetration but full penetration was only found at reduced moisture contents which were below practical, working moisture contents. Timber dried to such levels can suffer problems such as warping or splitting, which Would render such timber of little commercial value.

An object of the present invention is to obviate or mitigate the aforesaid disadvantages, and to provide a treatment and apparatus also suitable for wood-based board materials.

According to one aspect of the present invention, there is provided a method of treating timber or wood based board comprising exposing said timber or board to vapour derived from a mixture comprising an organo-boron compound and a second compound, said compounds being capable of forming a positive azeotrope if mixed in suitable molar proportions, said organo-boron compound hydrolysing to boric acid reaction product in said timber or board and other reaction product, the vapour exposure being effected at a temperature which, under the treatment conditions selected, is greater than or equal to the boiling point of the mixture used, but below the boiling point of said other reaction product.

The treatment temperature, under the selected treatment conditions of e.g. reduced initial pressure, wood or board type, moisture content, desired level of boric acid penetration, is therefore most preferably capable of generating vapour from the mixture but of suppressing vaporisation of the other reaction product, being suppression of vaporisation of methanol reaction product in the case that TMB is used as the organo-boron compound. It has been found that commercially available positively azeotropic liquid mixture of TMB/methanol performs well in the present invention, comprising approximately equi-molar proportions of these two compounds, and having a boiling point lower than both individual compounds.

The molar proportion of the second compound may vary and it is preferred to use mixtures whereby the molar amount of second compound is from 10% to 90%, more preferably at or near the azeotropic molar percentage.

According to an embodiment of the present invention there is provided a method of treating timber or wood based board comprising exposing the timber or wood based board to the vapour of a positive azeotrope of a liquid organo-boron compound, which compound is hydrolysable to boric acid, with a second liquid, said treatment being effected at a temperature above the boiling point of (i) the azeotropic mixture, but below the boiling point of (ii) the reaction product with the lower boiling point under the prevailing treatment conditions.

It is further preferred that the treatment is effected at a temperature which is also below the boiling point of (iii) the individual azeotrope constituents under the prevailing treatment conditions.

Apparatus, suitable for carrying out the present method, comprises a treatment chamber capable of receiving wood or wood based board and of being partially or substantially evacuated, means associated with the chamber for ascertaining the temperature and/or pressure therein, a reservoir for containing the mixture in gaseous or liquid communication with the treatment chamber, means permitting continuous presence of mixture vapour in said treatment chamber, and means for altering the treatment chamber pressure and/or temperature.

It is preferred that the treatment apparatus i.e. treatment chamber, mixture reservoir and connecting means, e.g. pipes are maintained at the same temperature to maintain equilibrium between the liquid and gas phases during treatment.

The treatment can be carried out at any suitable temperature and/or pressure providing the above stated temperature and boiling point relationship is maintained.

For example only, treatments may be carried out at a temperature in the range of −20° C. to 75° C., preferably in the range of 10° C. to less than 64.7° C., and at an initial reduced pressure in the range of 750 mbar to less than 1 mbar, preferably in the range of 500 mbar to less than 1 mbar. Treatment may be carried out at an initial increased pressure.

The organo-boron compound is preferably an alkyl borate such as trimethyl borate [$B(OCH_3)_3$].

The most preferred organo-boron compound is trimethyl borate (TMB) and the other compound is preferably methanol. However, other liquids forming a binary or, indeed, ternary azeotrope with the organo-boron compound may be used. The second compound used is conveniently a liquid.

Treatment of timber or board can be carried out to achieve partial penetration of boric acid into said timber or board, wherein such partial penetration may be about 5% to 25% of the thickness and/or depth of the timber or board.

Preferably the treatment is continued for a time sufficient to deposit in the timber or board a concentration of boric acid of not more than 3% by weight, and preferably from 0.1 to 1% by weight, for preservative treatment or from 3 to 20% by weight for flameproofing or fireproofing.

The moisture content of the board and/or timber prior to vapour treatment may be in the range 0–28%, preferably 2–20% for boards, and 6–20% for timber. Wood based boards can be treated at their working moisture contents, i.e. in the range 4% to 12%.

Preferred treatment involves introduction of mixture vapour, e.g. azeotrope vapour into a treatment chamber which is pre-evacuated, to achieve an initial vacuum before vapour treatment.

The initial vacuum, if applied, may be in the range from 500 to less than 1 mbar, more preferably 100 to less than 1 mbar. The vacuum is most preferably applied prior to introduction of the boron preservative i.e. mixture vapour. We believe that since the vapour pressure of the present mixture can exceed the vapour pressure of the reaction products, vaporisation of the other reaction product (e.g. principally methanol) can be effectively suppressed.

In the above reaction between organo-boron compound and moisture a large (3 times) molar excess of other reaction product is produced.

Vaporisation of this other reaction product, (e.g. methanol) would increase the reaction pressure and consequently inhibit further vaporisation of the organo-boron compound. This, we believe, markedly reduces the efficiency of treatment of wood or wood based boards either at or below normal working moisture contents by severely limiting the available organo boron gas concentration. In contradistinction, by means of the present method we believe that the methanol tends to preferentially condense as liquid in the timber or wood based boards, i.e. its vapour suppression enables considerably improved boron preservative vaporisation (derived from the present mixture) thereby surprisingly improving the efficiency of boric acid deposition.

By using treatments according to the invention, the vapour concentration derived from the mixture can be maintained at a maximum practical level throughout the treatment time selected. This enables continuous replenishment of mixture vapour during the treatment; a most preferred aspect of the present treatment as exemplified below.

This continuous replenishment of vapour comprising the organo-boron compound, can be achieved by maintaining gaseous communication between the reservoir of mixture and the treatment vessel or by providing liquid communication therebetween such that vaporisation takes place in the treatment chamber for the treatment time selected. As the reaction proceeds between TMB and the water in the wood or wood based board, gas concentration decreases, the vacuum increases drawing more mixture vapour into the chamber, eventually reaching an equilibrium but providing an almost unlimited supply of organo-boron preservative in the vapour.

The treatment time may be dependent on the various treatment conditions and may be selected on the basis of desired boric acid retention.

In certain embodiments of the present invention, useful for treating timber, the solid wood can be treated at its working moisture content, as described previously.

Such embodiments for treating solid wood can be devised which avoid the need to (a) pre-condition the untreated wood to a moisture content below working moisture content and/or (b) the need to post-condition the treated wood to a practical working moisture content for its intended final use. Depending upon treatment conditions it may alternatively be desirable to pre-condition by heating to reduce the pre-treatment moisture content and/or post-condition to increase the moisture content e.g. by steam conditioning. Such conditioning techniques are known in the timber processing art and the present invention embraces treatment of wood or wood based products which either have or have not undergone moisture content alteration.

BRIEF DESCRIPTION OF THE DRAWINGS

In order that the present invention in its various aspects may be illustrated and readily carried into effect, non-limiting embodiments thereof will now be described by way of example only, with reference to the accompanying drawings in which:

FIG. 1 shows a liquid/vapour phase diagram for mixtures of TMB/methanol at atmospheric pressure, and FIG. 2 shows one form of apparatus, suitable for carrying out treatment.

FIG. 1 of the drawings herewith shows a phase diagram for trimethyl borate/methanol mixtures at atmospheric pressure. From FIG. 1 it will be seen that the minimum boiling point (54.3° C.) of an azeotropic mixture of the two compounds occurs at equi-molar proportions. The boiling point of methanol is about 64.7° C. and that of TMB is about 68.5° C. Using this particularly preferred azeotrope, therefore, requires a treatment temperature below 64.7° C. but at or above 54.3° C. at atmospheric pressure. Equivalent temperatures and pressures could be used as defined by the vapour pressure/temperature relationship for the mixture.

One suitable form of small scale treatment plant shown in FIG. 2 consists of an internal treatment chamber 1 contained within an environmental chamber 2, the temperature of which could be accurately controlled over a range from −70° C. through to +200° C. (+/−0.1° C. accuracy).

The internal treatment chamber can be cylindrical and constructed of steel tubing and stainless steel plates used for the end plate, flange and lid of the cylinder. End plate and flange can be welded to ensure a vacuum tight fit. Two pins can be placed in the flange to locate the lid when sealing the chamber. A handle may be attached to the outside of the lid to facilitate handling while on the inside, a silicone rubber "O" ring can be used in a machined groove to ensure a vacuum tight seal between lid and flange. The whole cylinder was fastened in a cradle for stability.

Four ports (3–6) were drilled and tapped in the cylinder wall via stainless steel bosses to accommodate:

a thermocouple at port 3 linked to a digital thermometer (accuracy +/−1° C. not shown), a pipe 10, at port 4, linking a reservoir 7 of TMB/methanol mixture in vapour communication with the main treatment chamber 1, a pipe 11, at port 5, connected to a vacuum pump, and a pressure transducer (not shown), at port 6, linked to a digital gauge (not shown, accuracy +/−1 mbar) to determine the vacuum level within the treatment chamber.

The pipe 11 connecting the main treatment chamber 1 to the vacuum pump (not shown) and a tap 9 controlling gaseous vapour flow from the TMB/methanol mixture reservoir 7 and the treatment chamber I pass through the wall of the environmental chamber for easy adjustments. A valve 8 operated by tap 9 is located in the vapour communication pipe 10 between container 7 and chamber, to permit evacuation prior to vapour exposure.

PROTOCOLS

The materials used were;

1. Oriented Strand Board (OSB), 18 mm thick, which had an equilibrium moisture content in the laboratory of approximately 6%.
2. Flooring grade chipboard (18 mm) with a moisture content of 10%.
3. Solid wood of the slow grown Pinus sylvestris which was conditioned to a range of moisture contents of from 6 to 12%.

The board samples were cut to dimensions 100 mm×100 mm×board thickness and edge sealed with an ABS polymer before treatment The solid wood was cut to 50×50 mm cross section×160 mm length and the ends sealed with epoxy resin.

After conditioning of the sample specimens to known moisture content, if required, they were placed in a treatment chamber at a selected temperature which was then sealed and the samples allowed to equilibrate to the ambient temperature therein.

The combination of treatment temperature and pressure was selected such that at least some organo-boron compound would be in the vapour phase as part of the mixture vapour. Thereafter, a valve connecting the treatment chamber to a reservoir of treatment material (either TMB alone, for comparison purposes, or the preferred TMB/methanol azeotrope), was opened allowing vapour to enter the chamber. The exposure to the vapour was maintained for a selected period of time.

At the end of the treatment time the increase in pressure was recorded, and the chamber vented to atmosphere and purged with nitrogen to expel residual vapour.

The treated specimens were weighed to determine the weight increase caused by deposition of boric acid. Distribution of boric acid within the specimens was assessed visually after spraying a centrally cut cross-section with a staining reagent consisting of 0.25 g of curcumin and 10 g of salicylic acid dissolved in 10 ml of ethanol. This stain reveals boric acid above 0.2% w/w as a red colouration (British Standard: 5666 part 2, 1980).

The loading of boric acid was also determined quantitatively by the method described by Williams [Analyst 93: 111-115 (1968) and Analyst, 95: 498-504 (1970)].

EXAMPLE 1

Table I below summarises the influence of temperature and moisture content on retention and penetration in solid wood using the azeotrope of TMB and methanol according to the invention, and, for comparison, pure TMB. The treatment time was four hours.

TABLE I

| Temp °C. | Moisture % (dry) | 99% TMB Retention % (dry) | Penetration (mm) | Azeotrope Retention % (dry) | Penetration (mm) |
|---|---|---|---|---|---|
| 20 | 12 | 2.9 | 3.7 | 4.4 | 5.1 |
| 50 | 12 | 5.8 | 6.0 | 10.9 | 8.0 |
| 50 | 10 | | | 11.3 | 11.0 |
| 55 | 10 | 7.9 | 9.2 | 11.4 | 12.2 |
| 65 | 8 | | | 11.6 | 14.6 |
| 65 | 6 | 7.8 | 14.2 | 10.4 | 18.3 |

Retention values quoted are the mean of five replicates and are given as increase over the dry weight of the specimens.

The data in table 1 illustrate increased retention and penetration achieved with a mixture according to the invention, compared with TMB alone. It is also noted that whilst a partial impregnation of the timber samples is achieved under all the treatment conditions selected, the use of a vapour mixture of organo-boron compound and second compound provides a markedly superior degree of penetration. It is particularly surprising and therefore advantageous that an improved level of penetration i.e. better partial impregnation with preservative at lower temperature e.g. 20° C., and at higher moisture content e.g. 12% is obtainable.

The penetration levels achievable with the present mixture, and particularly with the preferred azeotropic mixture, at these temperature and moisture levels may be quite satisfactory for certain end uses of the wood, or board.

EXAMPLE 2

Table II below summarises the effect of treatment time on the boric acid retention for Oriented Strand Board (OSB), of moisture content 6%, using the azeotrope in accordance with this invention and, for comparison, pure TMB.

TABLE II

| Time (min) | At 50° C. RETENTION Azeotrope | At 50° C. RETENTION 99% TMB | At 20° C. RETENTION Azeotrope | At 20° C. RETENTION 99% TMB |
|---|---|---|---|---|
| 1 | 0.3 | | 0.2 | |
| 5 | 1.5 | 1.0 | 0.8 | 0.5 |
| 10 | 2.0 | 1.5 | 1.3 | 0.8 |
| 20 | 3.1 | | 1.8 | |
| 45 | 4.8 | | 2.7 | |

Full penetration of all samples was observed. Quantitative determination of the 10 and 20 minute samples for the azeotrope gave 2.2% and 1.5% at 50° and 20° respectively and 3.0% and 2.0% at 50° and 20° C.

EXAMPLE 3

Specimens of 18 mm chipboard (BS:5669 Type ii/iii) of moisture 10% were treated to retentions of boric acid consistent with its use as a flame retardant by exposure to the TMB/methanol azeotrope at 50° C. The results of varying the treatment time are reported in Table III below.

TABLE III

| Time (mins) | Retention (%) |
|---|---|
| 30 | 4.1 |
| 60 | 6.2 |
| 120 | 7.6 |

Full penetration was observed in all specimens.

Treatment of other board materials, e.g. MDF, OSB, has achieved boric acid retentions up to 14% and 18%, respectively, at appropriate board moisture contents and treatment conditions.

From the results quoted in Example 2 above, it will be seen that for OSB the azeotrope treatment confers no particular advantage over pure TMB as far as penetration is concerned since full penetration was observed with both treatments: the advantage lies in the increased loading of boric acid achieved by use of the process of the invention.

As far as solid timber is concerned (Table I), improvements in both loading and penetration by use of the process of the invention are achieved. It is expected that full penetration across a 50 mm×50 mm cross section pine will be achievable, given optimised treatment conditions.

Boric acid has many properties which make it ideal for use as a preservative for wood based board materials:

1. Proven effectiveness against decay fungi and insects.
2. Low mammalian toxicity.
3. Minimal vapour pressure.
4. Colourless.
5. No deleterious effects on wood.

The commonly cited disadvantage of the leachability of borate is not considered to be problematical in the present application since most wood based boards are not intended for use in situations of high leaching hazard. This treatment can be used with manufactured boards and thereby may avoid another potential disadvantage in board treatments, namely that of interference of the preservative with the bonding of the board during manufacture. The application of preservatives to board materials after manufacture allows fabrication to proceed under optimal production conditions and has a secondary advantage in that a varying proportion of board output can be treated in response to demand for preserved boards.

The present method can produce boards ready for use immediately after treatment.

For the majority of boards, e.g. OSB—MDF, Chipboard, Waferboard etc. moisture level conditioning is not necessary pre- and post- vapour treatment. After manufacture these boards generally have an appropriate moisture content at the production site where vapour treatment might be carried out particularly economically by virtue of reductions in energy and transportation costs. Of course, the invention can still be used for treatment of boards which have achieved an equilibrium moisture content in storage or are conditioned to achieve a working moisture content as part of the board production process.

We claim:

1. A method of preserving timber or wood based board comprising exposing said timber or board having a moisture content up to 28% by weight to a vapor mixture comprised of a positive azeotrope of an organo-boron compound and an alcohol at a temperature greater than or equal to the boiling point of the mixture, but below the boiling point of the alcohol, wherein said organo-boron compound hydrolyses to form a boric acid reaction product in said timber or board.

2. A method as claimed in claim 1 in which said organo-boron compound comprises trimethyl borate and said alcohol comprises methanol.

3. A method as claimed in claim 1 further comprising the formation of methanol as a reaction product.

4. A method as claimed in claim 1 wherein the method is carried out in a partial vacuum.

5. A method as claimed in claim 1 wherein the vapor exposure is effected at a temperature which is also below the boiling point of said organ-boron compound.

6. A method as in claim 1 wherein the treatment is effected to achieve partial penetration of boric acid into said timber or board.

7. A method as claimed in claim 1, wherein said temperature is in the range of −20° C. to 75° C.

8. A method as claimed in claim 7, wherein the treatment temperature T, at atmospheric pressure, is in the range 54.3° C.≦T<64.7° C.

9. A method as in claim 1 which uses an apparatus, said apparatus comprising a treatment chamber capable of receiving wood or wood based board and of being at least partially evacuated, means for ascertaining the temperature or pressure therein, a reservoir for containing a mixture of an organo-boron compound and a second compound, means for gaseous or liquid communication between said reservoir and said chamber, and a means for adjusting pressure or temperature, characterized in that said timber or board is exposed in the apparatus 1.

10. The method of claim 9, wherein the treatment chamber, mixture reservoir and communication means are maintained at the same temperature.

11. The method of claim 10, wherein the apparatus is housed in a chamber.

12. Timber or wood-based board, treated by a method as claimed in claim 1.

13. Timber or wood-based board, treated by a method as claimed in claim

14. A method as claimed in claim 1 wherein said mixture comprises an azeotropic mixture of trimethyl borate and methanol.

15. A method as claimed in claim 1 wherein the method is carried out at a moisture content of said timber in the range of 6 to 20 percent by weight.

16. A method as claimed in claim 1 wherein the method is carried out at a moisture content of said wood based board in the range of 2 to 20 percent by weight.

17. A method as claimed in claim 1 wherein the treatment temperature is in the range of 10° C. to <64.7° C.

18. A method of preserving timber or wood based board comprising partially drying said timber or board having a moisture content up to 28% by weight, exposing said partially dried timber or board to a vapor mixture comprised of a positive azeotrope of an organo-boron compound and an alcohol at a temperature greater than or equal to the boiling point of the mixture, but below the boiling point of the alcohol, wherein said organo-boron compound hydrolyses to form a boric acid reaction product in said timber or board.

19. A method of preserving timber or wood based board comprising exposing said timber or board to a vaporized azeotrope comprised of trimethyl borate and methanol at a temperature greater than or equal to the boiling point of the azeotrope but below the boiling point of the methanol, wherein said trimethyl borate hydrolyses to form boric acid in said timber or board and methanol.

20. The method of claim 19 conducted at atmospheric pressure.

21. The method of claim 20, wherein said temperature is greater than or equal to about 54.3° C. and less than about 64.7° C.

* * * * *